United States Patent
Sandler (10) Patent No.: US 11,526,506 B2
(45) Date of Patent: Dec. 13, 2022

(54) RELATED FILE ANALYSIS

(71) Applicant: Code42 Software, Inc., Minneapolis, MN (US)

(72) Inventor: Boris Sandler, Minneapolis, MN (US)

(73) Assignee: Code42 Software, Inc., Minneapolis, MN (US)

(*) Notice: Subject to any disclaimer, the term of this patent is extended or adjusted under 35 U.S.C. 154(b) by 0 days.

(21) Appl. No.: 16/874,078

(22) Filed: May 14, 2020

(65) Prior Publication Data
US 2021/0357396 A1   Nov. 18, 2021

(51) Int. Cl.
*G06F 16/24* (2019.01)
*G06F 16/245* (2019.01)

(52) U.S. Cl.
CPC ................... *G06F 16/245* (2019.01)

(58) Field of Classification Search
CPC ...... G06F 16/14; G06F 16/245; G06F 16/152; G06F 16/30
See application file for complete search history.

(56) References Cited

U.S. PATENT DOCUMENTS

| | | | |
|---|---|---|---|
| 9,501,640 B2* | 11/2016 | Beveridge | G06F 21/563 |
| 2008/0044016 A1* | 2/2008 | Henzinger | G06F 16/958 |
| | | | 707/E17.116 |
| 2013/0325829 A1* | 12/2013 | Agarwal | G06F 16/2308 |
| | | | 707/703 |
| 2014/0025712 A1* | 1/2014 | Chisa | H04L 67/1097 |
| | | | 707/827 |
| 2014/0082006 A1* | 3/2014 | Knight | G06F 16/24 |
| | | | 707/758 |
| 2014/0188919 A1* | 7/2014 | Huffman | G06F 16/951 |
| | | | 707/758 |
| 2015/0095356 A1* | 4/2015 | Wu | G06F 21/10 |
| | | | 707/755 |
| 2015/0143064 A1* | 5/2015 | Bhargava | G06F 11/1464 |
| | | | 711/162 |
| 2015/0227546 A1* | 8/2015 | Abuelsaad | G06F 16/10 |
| | | | 707/827 |
| 2015/0317325 A1* | 11/2015 | Key | G06F 16/152 |
| | | | 707/770 |
| 2016/0078245 A1* | 3/2016 | Amarendran | H04L 63/0428 |
| | | | 713/193 |
| 2016/0092043 A1* | 3/2016 | Missig | G06F 3/0482 |
| | | | 715/811 |
| 2016/0132521 A1* | 5/2016 | Reininger | G06F 16/156 |
| | | | 707/739 |

(Continued)

*Primary Examiner* — Alicia M Willoughby
(74) *Attorney, Agent, or Firm* — Schwegman Lundberg & Woessner, P.A.

(57) ABSTRACT

A system a module that is configured to cause a processor to obtain a set of file references that are configured to access files associated with a first computing system, where the set of file references include a references to the target file and one or more source files. The module is further configured to cause the processor to retrieve the target file and the one or more source files and to partition the target file and the one or more source files into respective first set of tokens and second set of tokens. The module is further configured to cause the processor to identify, based on the first set of tokens and the second set of tokens, at least one source file of the one or more source files that contain a threshold quantity of tokens of the target file.

17 Claims, 8 Drawing Sheets

(56) References Cited

U.S. PATENT DOCUMENTS

| | | | |
|---|---|---|---|
| 2018/0300315 A1* | 10/2018 | Leal | G06F 16/355 |
| 2019/0361843 A1* | 11/2019 | Stoddard | G06F 16/152 |
| 2020/0193019 A1* | 6/2020 | Tietz | G06F 16/11 |
| 2020/0279004 A1* | 9/2020 | Serdy | G06F 16/93 |
| 2020/0358621 A1* | 11/2020 | Ngo | H04L 9/0643 |

* cited by examiner

RELATED FILE ANALYSIS

TECHNICAL FIELD

Embodiments of the present disclosure relate generally to computer security, more particularly, but not by way of limitation, to automatic determination of relationships between files and the analysis of such files based on the determination.

BACKGROUND

Corporations, firms, business entities, and other institutions (hereinafter, "organizations") can manage distributed information technology infrastructures that provide computing and intellectual property resources to employees, clients, and other users. Organizations are typically obliged to invest a considerable amount financial and human capital in securing intellectual property resources from unauthorized access or removal from their possession. This is due, in part, to the numerous available data exfiltration vectors that make it easy or convenient to any employee legally, or illegally, to move data between computing resources. As a result, during the normal course of business, any employee that has access to the intellectual property resources of an organization is a potential risk to the security of those resources.

A given organization can make its intellectual property resources available to authorized user though one or more computing resources, such as user computing devices, computing servers, or hosted or network-based computing environments and storage systems. Such computing resources can be configured with filesystems having filesystem elements that facilitate the storage, manipulation, and communication of large amounts of data, such as the intellectual property resources.

Techniques exists of tracking the movement of a file and their distribution across an organization. Additionally, file exfiltration detection techniques enable organizations to detect files leaving, or being removed from, a digital perimeter of the organization.

BRIEF DESCRIPTION OF THE DRAWINGS

Various ones of the appended drawings merely illustrate example embodiments of the present disclosure and cannot be considered as limiting its scope. Additionally, the headings provided herein are merely for convenience and do not necessarily affect the scope or meaning of the terms used.

DETAILED DESCRIPTION

Existing techniques for tracking the movement of a file across an organization or for detecting files leaving a digital perimeter of an organization can depend on identifying and tracking whole files based on a digital signature, such as a file digest hash, of the file. Such digital signatures are unique to, or are based on, the entire contents of the file. An example of such digital signatures include MD5 hashes. A consequence of a digital signature being unique to the entire contents of file is that any change to the contents of the file results in a change to the digital signature. Such a limitation can create gap in file tracking or exfiltration detection techniques that are based on these signatures. In an example, existing file tracking and exfiltration detection techniques can fail to track or detect the removal a target file that contains content (e.g., data) copied from a security sensitive source file when the content of the source file is only partially copied to the target file or when a target file contains additional content beyond the content of the source file. In this example, the digital signature of the source file will be different from the digital signature of the target file, therefore the existing file tracking or exfiltration detection techniques may not detect that the two files are related.

Examples of the present disclosure are based on the recognition that exiting file tracking or exfiltration detection techniques can be improved, such as to overcome or mitigate the effect of the discussed limitations, by providing techniques for detecting potential relationships between two or more files and then, using these relationships to determine whether any of the potentially related files actually contain related content.

Examples of the present disclosure include techniques (e.g., processes, systems, devices, or non-transient machine-readable storage mediums) for detecting potential relationships between two or more files. Such techniques include monitoring a computing system to detect operations to read or write a file. The techniques further include, response to detecting an operation read from, or to write to a file, determining whether there is a likelihood that the file contains sensitive content, such as content that has financial, intellectual, or other business value to an organization. Then techniques further include, responsive to determining that the file likely contains sensitive content, recording the operation to access the file and maintain a reference to the accessed (e.g., opened) file for a specified span of time after the file is closed. The techniques further include detecting an operation to create or write to a target file, and responsive to detecting the operation to write of modify the target file, generating a record (e.g., a snapshot) of the file identifiers of all presently or recently opened files that likely contain sensitive content (hereinafter, "source file" or "source files"). The techniques further include storing the target file and the sources in a data structure as a relationship set.

Examples of the present disclosure include techniques for analyzing files in an identified relationship set using large-token text comparisons to determine whether the files in the relationship set contain related content. The techniques include partitioning a target file of the relationship set into a first set of tokens and partitioning each file of the one or more source files into respective second sets of tokens. In an example, a token is a large token that is generated by tokenizing text content of an entire sentence or phrase rather than single words. The techniques further include identifying an intersection between the tokens of the target file and the tokens of the one or more source files. In an example, such identifying includes determining that the target file and at least one source file of the one or more of the source files have at least a specified threshold quantity or number of tokens in common. The techniques further include providing the at least one source file to a second computing system for further analysis.

Figure 1:
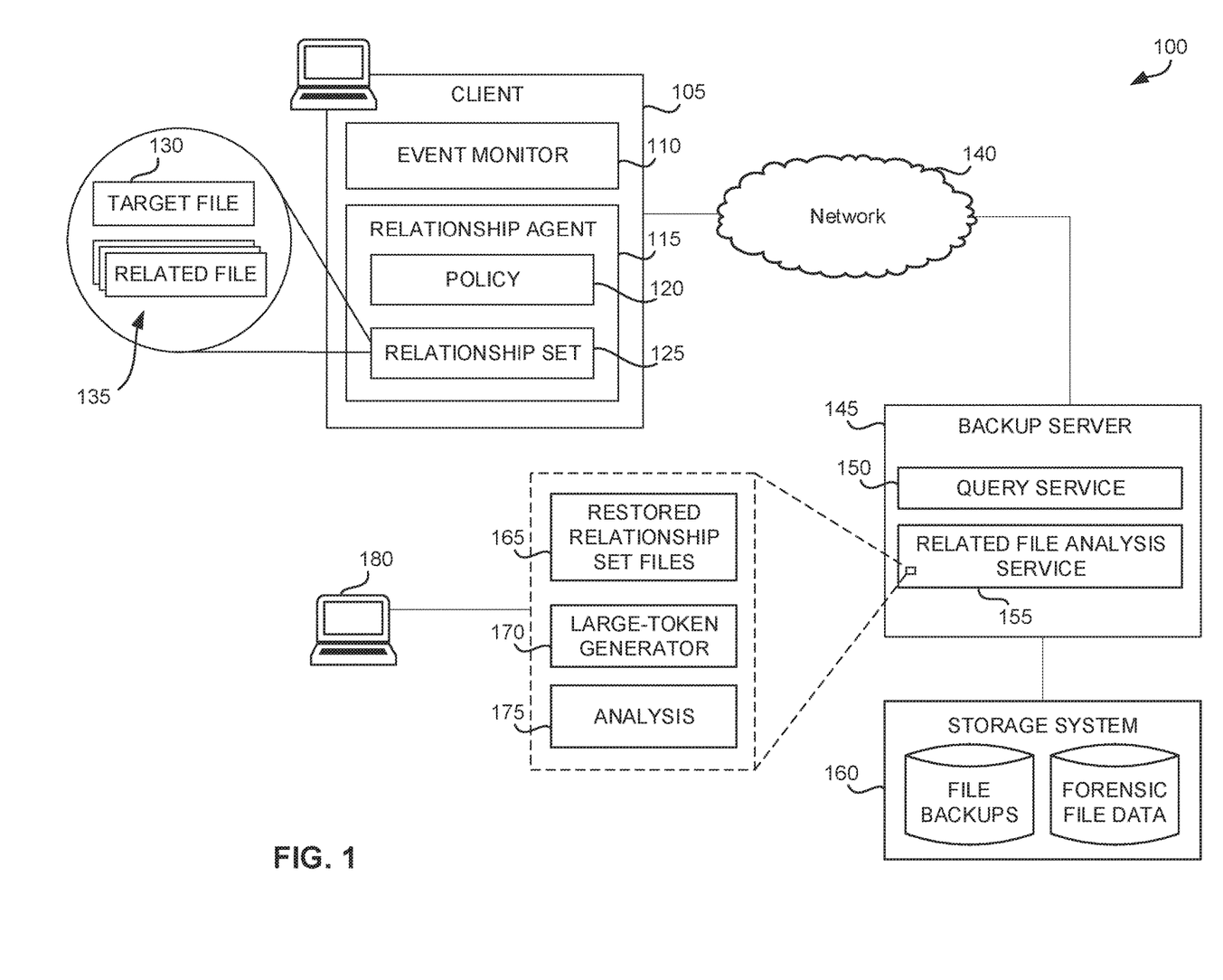
FIG. 1 illustrates a diagram of a system for related file analysis, according to an example of the present disclosure.

Turning now to the figures, FIG. 1 illustrates a diagram of a system 100 for related file analysis, according to an example of the present disclosure. In an example, the system 100 is configured to implement the techniques for generating relationship sets and performing related file analysis using the generated relationship sets. The system 100 can include client computing resource 105, data communication network 140, backup server 145, storage system 160, and operator computing resource 180. Components of the system 100 can communicate using the data communication network 140 or any other suitable data communication channel.

Client computing resource 105 can include any suitable computing resource for accessing files, such as for creating, reading, writing, or deleting one or more files. The client computing recourses can include an endpoint device, a computing server, or network-based or hosted computing environment. In an example, the client computing resource 105 includes an event monitor 110 and a relationship agent 115.

The event monitor 110 can include a circuit or a software application that is configured to detect or monitor filesystem events. A filesystem event (hereinafter, "event") can include any operation to create, read, modify, or delete a file or other file system element. In an example, the event monitor 110 is configured to detect file read, file write events (or file creation events). Responsive to detecting a file read or file write event, the event monitor 110 is configured to provide an indication of the event to the relationship agent 115. The indication of the event can include data that is indicative of whether a read or a write operation was performed. The indication of the event can also include data that is indicative of an identifier of, or a filesystem reference to, the file on which the operation was performed. In an example, the data can be a string, such as a string comprising the term "read" or "write", a numeric value, such as 0 for read and 1 for write, or any other suitable data. In an example the identifier of the file includes a filesystem identifier of the file, such as a filename and a file path.

The relationship agent 115 can include a circuit or a software application that is configured to generate a relationship set responsive to a file creation or a file write event detected by the event monitor 110. In an example, the relationship agent receives file read, write, and creation events from event monitor 110.

The relationship agent 115 can be configured determine whether the file associated with a file read or file write event is an eligible file based, such as based on a specified security policy 120. In an example, the security policy 120 indicates that a file is an eligible file when the MIME type of the file indicates that the file may contain sensitive content. In example, the security policy 120 can indicate that word processing, spreadsheet, and portable document format files are eligible because they are likely to contain sensitive content. The relationship agent 115 records file read or file write events that are associated with eligible files and maintains a reference (e.g., a file system identifier) to each opened eligible file for a specified span of time after the file is closed. In an example, the specified span of time is a specified number of minutes (e.g., 5 minutes) or hours (e.g., 1 hour) after the eligible file is closed.

The relationship agent 115 can be configured to identity a file that is associated with a file creation or file write event as a target file. The relationship agent 115 is further configured to, responsive to identifying a target file, identify all presently or recently open eligible files as source files and to generate a record or data structure that includes their identifiers. A recently open eligible file includes any eligible file whose reference is still maintained, such as in the memory of the client computing resource 105, by the relationship agent 115. The source files are indicative of files from which content may have been copied and transferred to a target file, such as by digital coping and pasting. The relationship agent can store the target file and the source files in a relationship set 125. Relationship set 125 can include any data structure that associates or stores a single target file, such as the target file 130, with one or more source files, such source files 135. The relationship agent 115 can transfer the relationship data structure to backup server 145 for storage or future analysis. In an example the relationship agent can encapsulate the relationship set in event packet and forward the event pack to the backup server, such as by using the event monitor 110.

The backup system 145 can include any system that is configured to interface with the monitor 110 or the relationship agent 115 to receive event data, file metadata, and file backup data, and relationship sets from the client computing resource 105. Such data can be stored in a forensic file data store or file backup data store on the storage system 160 and accessed through query service 150, such as described in United States (U.S.) patent application Ser. No. 16/360,273, which is titled "FORENSIC FILE SERVICE" and is hereby incorporated by reference.

The backup system 145 can include a related file analysis service 155. In some examples the related file analysis service 155 is included in another computing resource that is associated with the back server 145, such as the operator computing resource 180. The related file analysis service 155 includes a circuit or a software application that is configured to receive a request to identify a set of files having a significant intersection with a selected file. The request can be generated by the backup server 145 in response to a request to initiate a related file analysis based on the selected file. Responsive to receiving the request to identify a set of files having a significant intersection with a selected file, the related file analysis service 155 can retrieve a stored relationship set and generate a set of restored relationship files 165 based on file identifiers in the retrieved relationship set. In an example the selected file is a target file or one of the source files.

The related file analysis service 155 is further configured to use large-token generator 170 partition the files in the restored set of relationship set files into a set of tokens. The large-token generator 170 is configured to partition the text content of a file into one or more text elements and tokenize each text element. In an example, large-token generator 170 is configured to partition the text content of a file comprising one or more sentences or phrases a set of text elements, where each text element includes a sentence or a phrase. The large-token generator 170 can then tokenize each element as a whole. In an example, the token generated by the large-token generator 170 is a hash of a text element (e.g., a sentence or a phrase). In an example the tokens are MD5 hash codes, where each hash code is generated from a sentence or phrase including two or more words (e.g., twelve to 24 words). The large-token generator 170 can provide the tokens for each file to the analysis element 175.

The analysis component 175 can be configured to preprocess the set of received tokens so as to remove tokens that are designated, such as by a customer or an organization, as boilerplate tokens. The analysis component can be further configured to respectively compare the remaining tokens of two files, such as the selected file and a target or source file from a relationship set, to identify an intersection between the tokens of each file. In an example tokens generated from the selected file is compared to tokens generated from a source file to determine quantity of tokens that the two files have in common. The more tokens the two files have in common, both in absolute terms and proportionally to the sizes of the files, the greater the likelihood that the two files are related.

The analysis component 175 can generate a similarity score as an intersection percentage using the size of the selected file as a base for the calculation. In an example, if a file A, the selected file, has 60 tokens and a potentially related file B has 80 tokens, and the two files have 45 tokens in common, the similarity score is 75% as 45/60 of the file A is contained in file B. The analysis component 175 can identify files that contain specified percentage of common content with the selected file as a related file. The related files and their similarity scores can then be recorded or transmitted to operator computing resource 180. Other information generated during the analysis can be discarded to conserve resources Operator computing resource 180 can include any computing resource that is configured with one or more software application to interface with the backup server 145 to initiate related file analysis, such as by transmitting a request or query to the backup server to identify files related to a selected file. The operator computing resource 180 can receive related files identified by the backup server 145 and associated similarity scores. The operator computing resource 180 can perform further analysis using on the received related files and similarity scores, such as to identify or confirm a relationship between the selected file and relate file. The operator computing resource 180 can then determine whether the files are indicative of a security breach. The techniques described herein can scientifically reduce the number of files that an operator has to consider or analyze to make such determinations.

Figure 2:
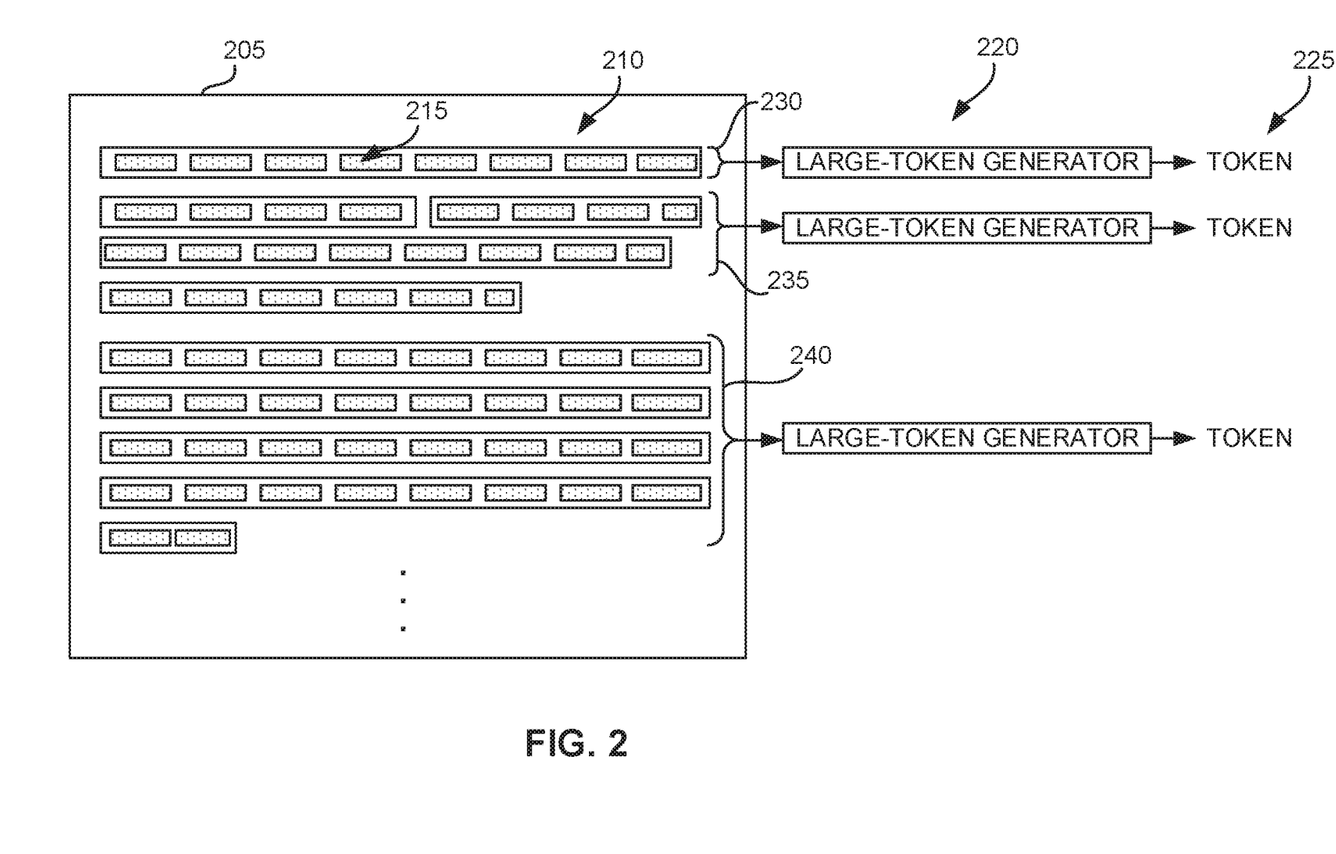
FIG. 2 illustrates a diagram of an example of tokenizing a file for large token analysis, according to an example of the present disclosure.

FIG. 2 illustrates a diagram of an example of tokenizing a file 205 for large token analysis, according to an example of the present disclosure. As shown in FIG. 2, the file 205 can include text comprising one or more sentences 210. Each sentence includes one or more words 215. The large-token generator 220 is configured to partition the text file into one or more text element 230, 235, or 240. Each text element (a text token) can include one or more sentences or phrases. The text element 230, 235, or 240 can be identified or delineated by a delimiter, such as a newline character in the file 205. The text element 230, 235, or 240 can be normalized by removing or ignoring letter casing, punctuation marks, or white spaces. In an example, the token large generator 220 generates fixed length tokens 225 using the text element 230, 235, or 240.

Figure 3:
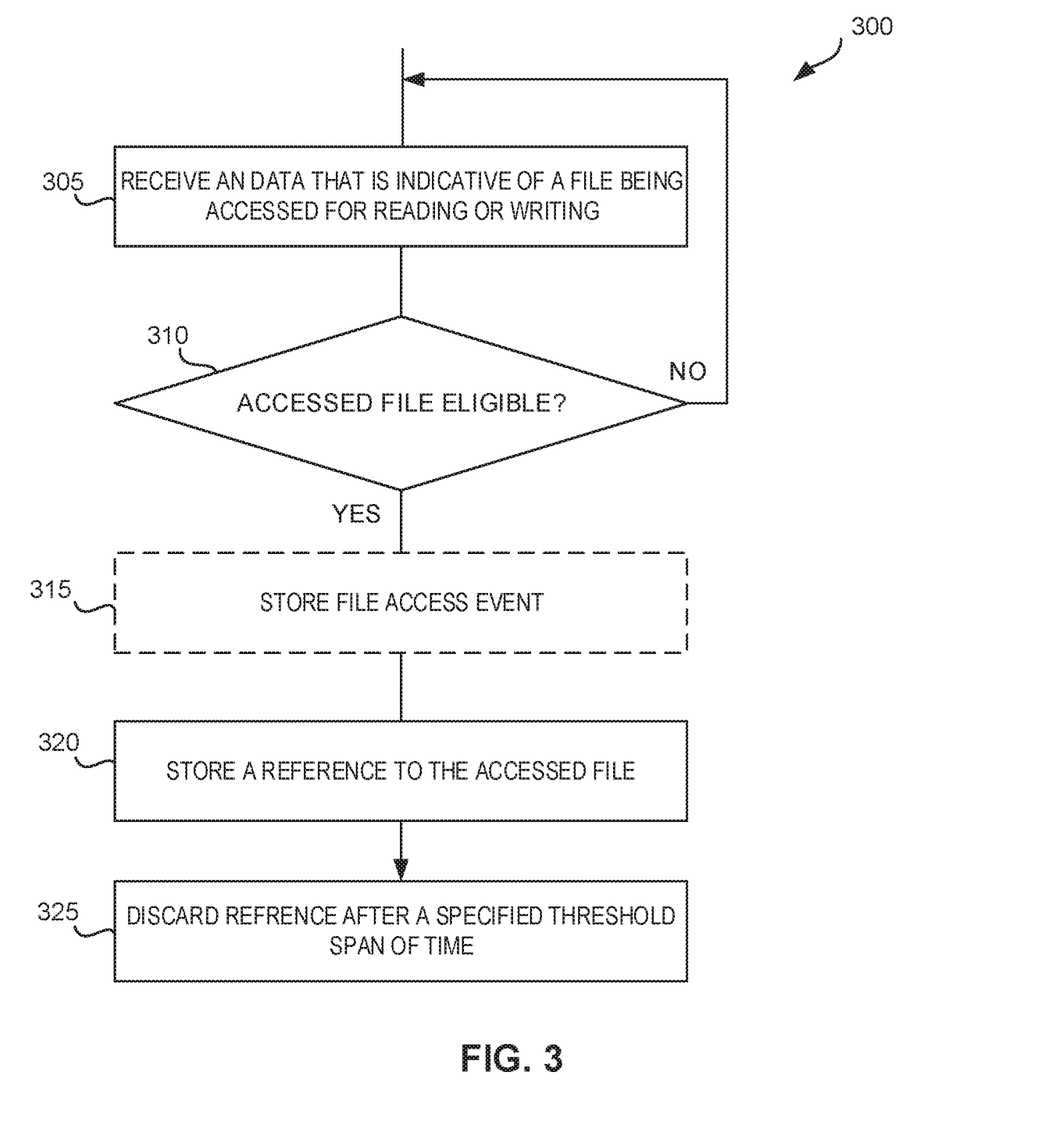
FIG. 3 illustrates an example of a process for identifying files for generating a relationship set for related file analysis, according to an example of the present disclosure.

FIG. 3 illustrates an example of a process 300 for identifying files for generating a relationship set for related file analysis, according to an example of the present disclosure. The process 300 can be implemented or executed by the relationship agent 115, as discussed in the description of FIG. 1, or by any other suitable component of the system 100. At 305 data that is indicative of a file being accessed for reading or writing is received. In an example, the received data includes event data that includes an indicator of the read or write operation and an operating system identifier of the file being accessed. At 310 a determination is made as to whether the accessed file is designated as eligible. In an example, a file designated as eligible if the MIME type of file is one of a set of MIME types that are designated as eligible. In another example, other policies or criteria can be used determine whether a file is eligible. The process 300 can return to step 305 when the accessed file is not eligible. The processing 300 can continue to 315 when the accessed file is eligible. At 315, the file access event is optionally stored, such as by storing the data received at 305. At 320 a reference to the accessed file is stored or maintained, such as in the memory of client computing resource 105, or a span of time after the file is closed. At 325, the reference is discarded at the expiration of the span of time.

Figure 4:
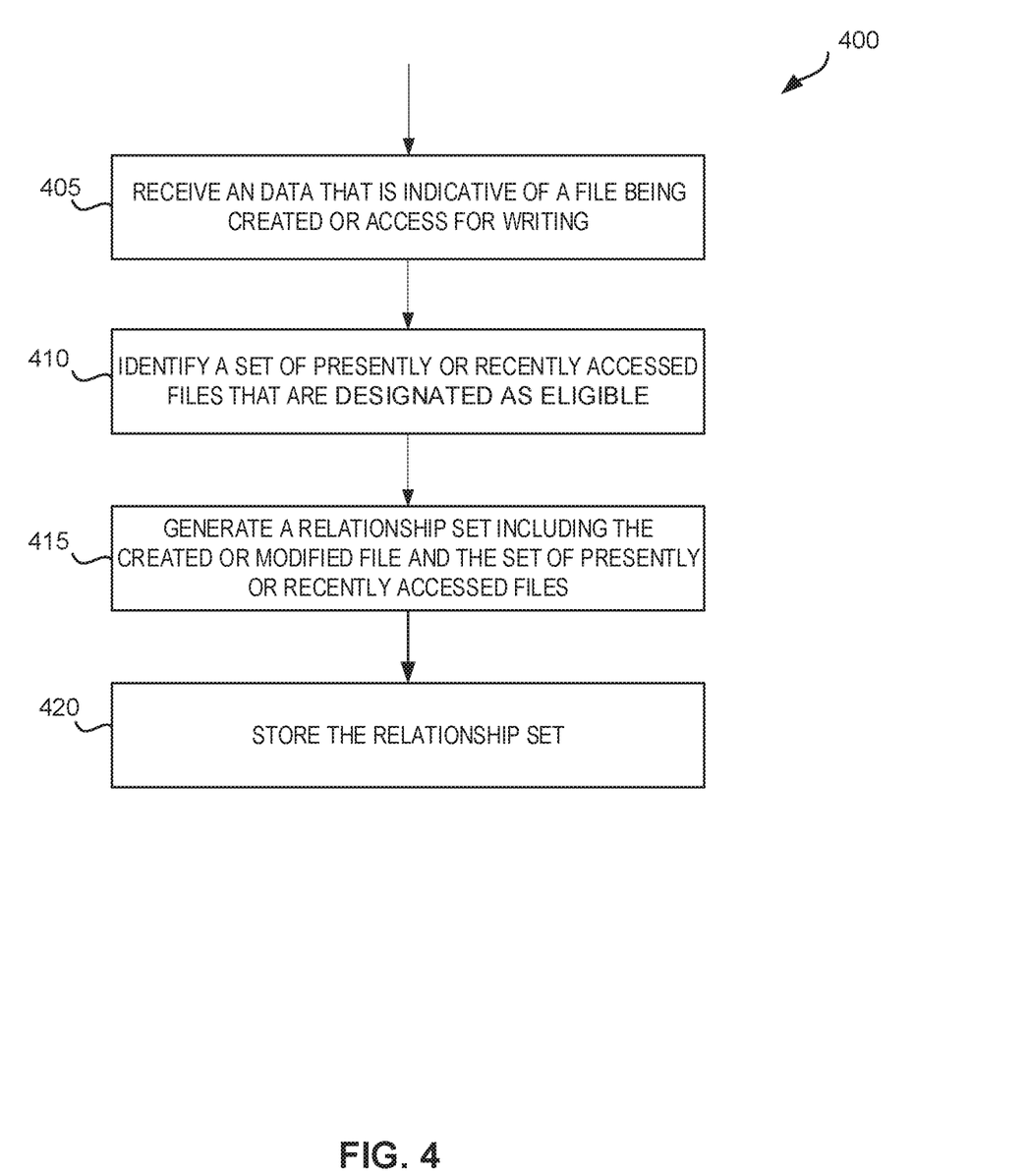
FIG. 4 illustrates an example of a process for generating a relationship set for related file analysis, according to an example of the present disclosure.

FIG. 4 illustrates an example of a process 400 for generating a relationship set for related file analysis, according to an example of the present disclosure. The process 400 can be implemented or executed by the relationship agent 115, as discussed in the description of FIG. 1, or by any other suitable component of the system 100. At 405, data that is indicative of a file being created or accessed for writing is received, such as from a filesystem monitor or an event monitor. In an example, the received data includes event data that includes an indicator of the file creation or file write operation. The event data can also include an indicator of an operating system identifier of the file that was created or accessed for writing. At 410, a set of recently accessed files that are designated as eligible, as described herein, are identified. At 415, a relationship set is generated. In an example, the relationship set includes the created or written file and the set of presently or recently accessed eligible files. At 420, the relationship set is stored, such as on the backup server 145.

Figure 5:
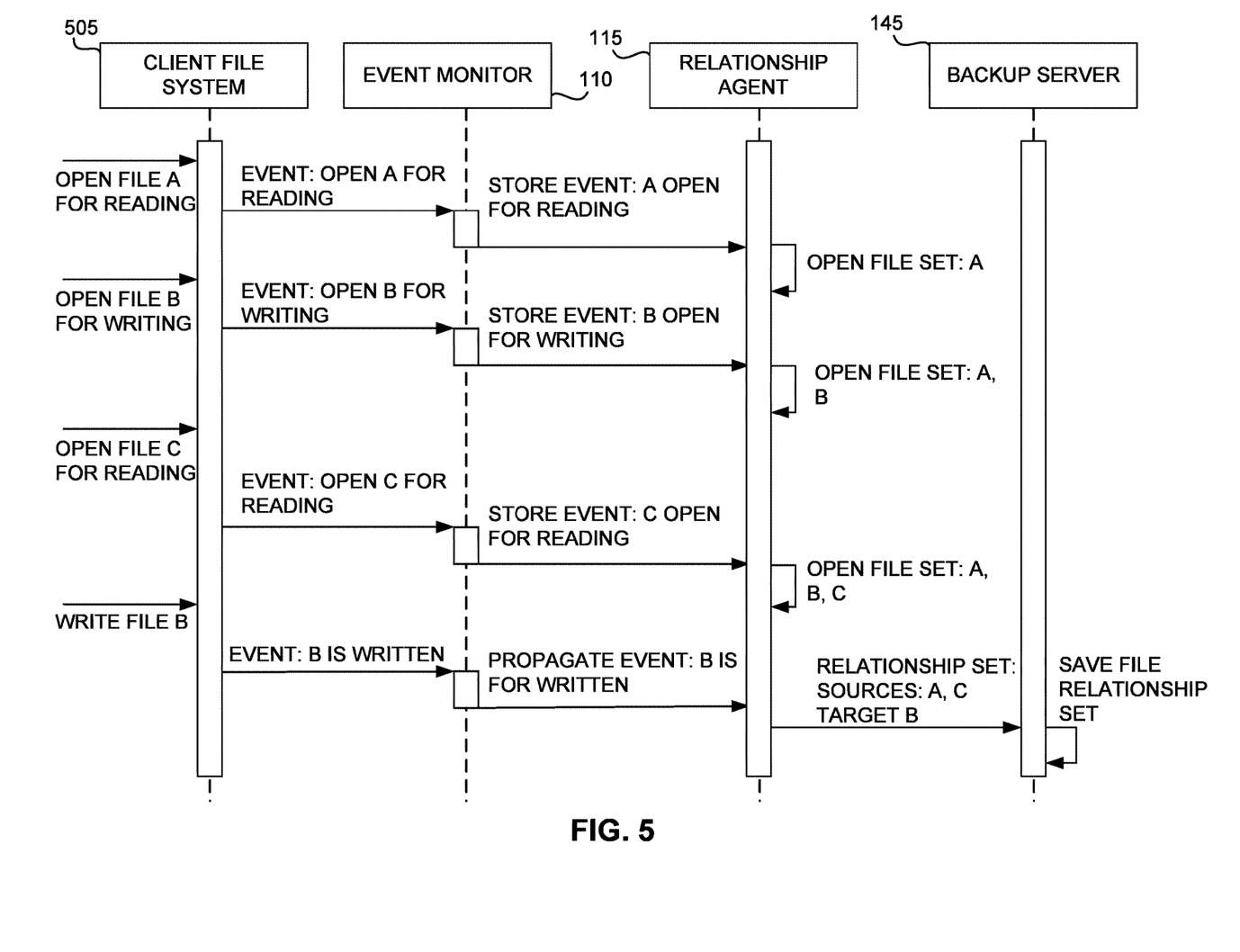
FIG. 5 illustrates a diagram of interactions between system components for generating a relationship set for related file analysis, according to an example of the present disclosure.

FIG. 5 illustrates a diagram of interactions between components of a system, such as the system 100, for generating a relationship set for related file analysis, according to an example of the present disclosure. As shown in FIG. 5, a client file system 505 can receive a request to open file A for reading. The request to open file A for reading causes the event monitor 110 to detect the event "A OPEN FOR READING". Responsive to detecting the event, the event monitor 110 forwards the event to relationship agent 115 for storage. Relationship agent 115 stores the event and adds an identifier of the open file A to a set of open files. In an example, the identifier is added after determining that A is eligible, as described herein. The interactions are repeated, responsive to the client file system 505 receiving requests to open file B be for writing and file C for reading, so as to expand the open set at the relationship agent 115 to include files A, B, and C. The client file system 505 then receives a request to write to the file B. The event "B IS WRITTEN" is propagated from the event monitor 110 to the relationship agent 115. Response to receiving the event, the relationship agent 115 generates a relationship set that identifies file B as a target file and files A and C as source files. The relationship set is then transmitted to the backup server 145 for storage.

Figure 6:
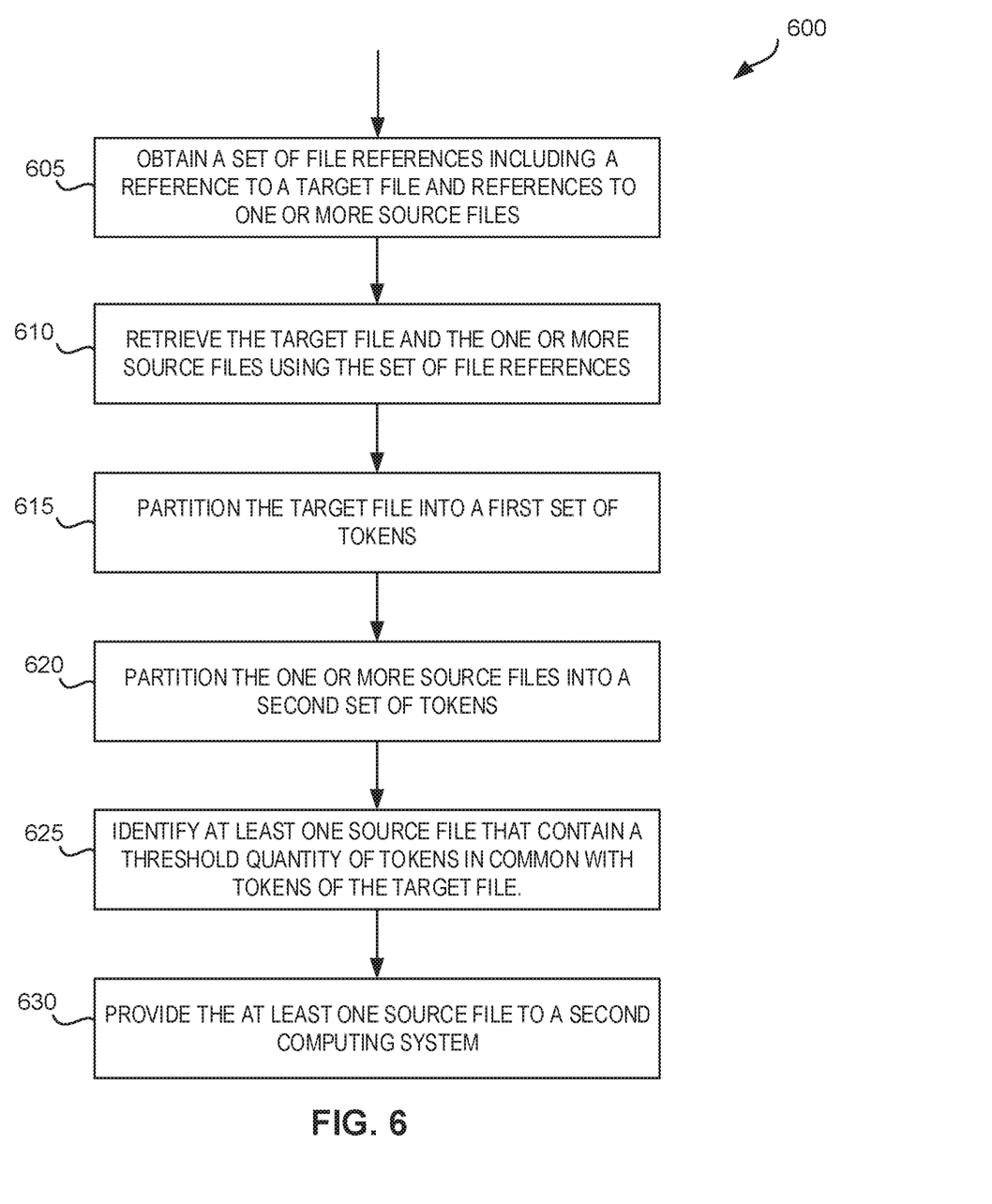
FIG. 6 illustrates an example of a process for relationship set analysis, according to an example of the present disclosure.

FIG. 6 illustrates an example of a process 600 for relationship set analysis, according to an example of the present disclosure. The process 600 can be implemented by the related file analysis service 155 or by any other suitable component of the system 100.

At 605, a set of file references is obtained. The set of file reference an include a reference to a target file and one or more references to one or more respective source files. In an example, the set of file references are obtained from a relationship set stored by the backup server 145. In another example, the set of file references are obtained by detecting an operation by a first computing system (e.g., the client computing resource 105) to create or modify (e.g., write) the target file and identifying the one or more source files based on files that were at least partially loaded in the memory of the first computing system within a window of time that is determined based on the detected operation to create modify the target file. The window of time can include at least one of a span of time prior execution of the operation to modify a target file or a span of time after to execution of the operation to modify a target file. A data structure that associates the reference to the target file with the references to the one or more source files can then be created and populated with obtained references. In yet another example, obtaining the set of file references includes selecting the one or more source files from files accessed on the first computing system based on a match between metadata associated with the files and a data security criteria. In an example, the data security criteria includes a security policy designating files having a specified MIME type as security sensitive, and therefore eligible to be included in the set of one or more source files.

At 610, the target file and the one or more source files are retrieved, such as from the storage system 160, using the set of file references, as described herein.

At 615, the target file is portioned into a first set of tokens, such as by using a large-token generator. At 620, the one or more source files are partitioned into a set of tokens, such as by using the large-token generator. In an example, partitioning the target file into a first set of tokens or partitioning the one or more source files into a second set of tokens includes partitioning at least one of the target file or the one or more source files based on a syntax of the contents of the target file and generating the first set of tokens or the second set of tokens based on the partition. In another example, partitioning the target file into a first set of tokens or partitioning the one or more source files into a second set of tokens includes generating tokens based on sentences, phrases, paragraphs, or other logical groupings of textual content in the target file or the one or more source files. In yet another example, partitioning the target file into a first set of tokens or partitioning the one or more source files into a second set of tokens includes partitioning the target file or the one or more source files into textual tokens (e.g., text elements) and generating hash code tokens using the textual tokens.

At 625, at least one source file that contains a threshold quantity of tokens in common with the tokens of the target file is identified, such as by determining a quantity of tokens from the first set of tokens that are included in the second set of tokens.

At 630, the at least one source file is provided to a second computing system, such as for further analysis or reporting. In an example, providing the at least one source file to a second computing system includes generating a data structure that includes a reference to the at least one source file and a statistic, such as a percentage, that is indicative of the quantity of the data of the target file that this stored in the at least one source file.

Figure 7:
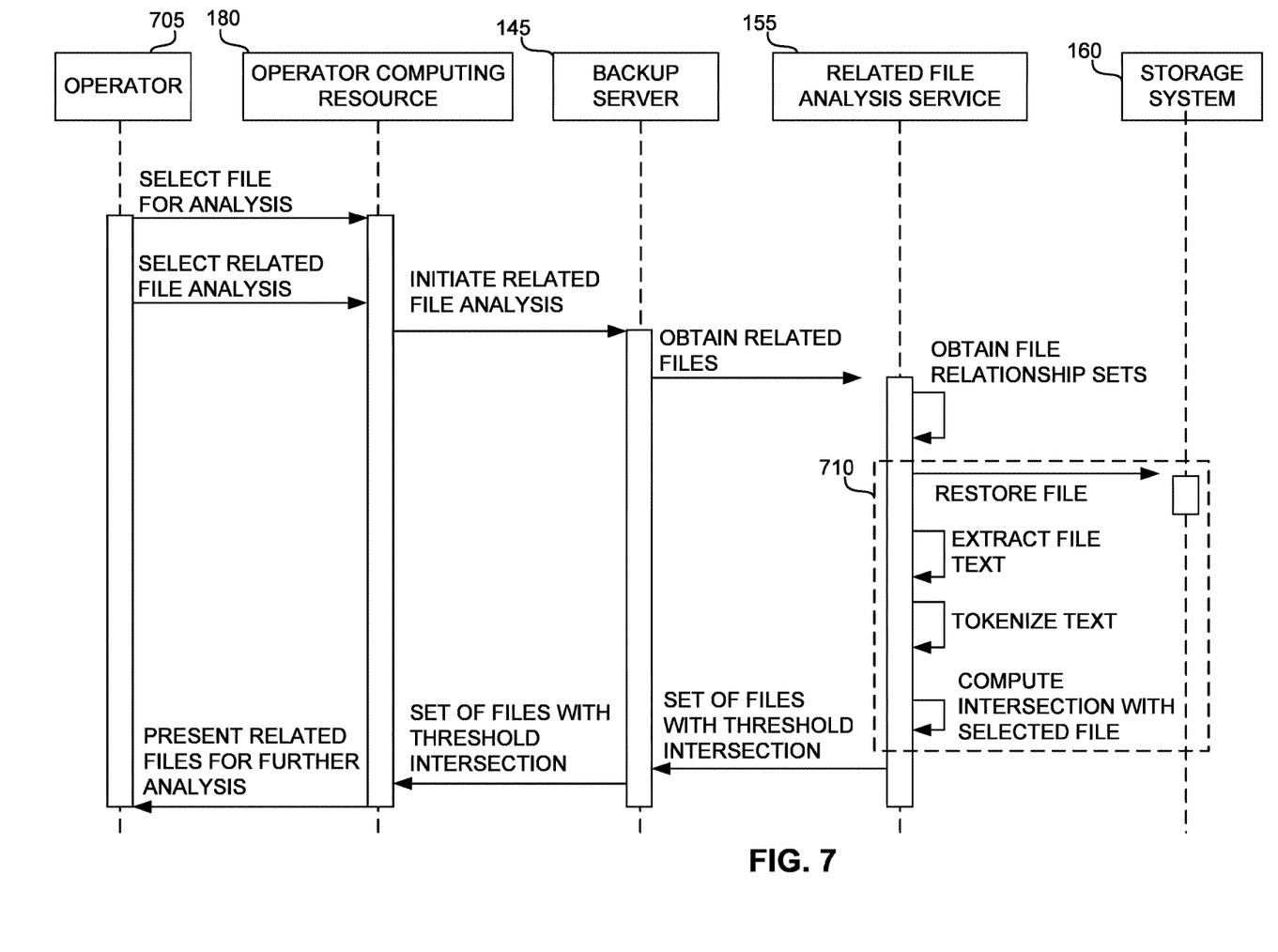
FIG. 7 illustrates a diagram of interactions between system components for related file analysis, according to an example of the present disclosure.

FIG. 7 illustrates a diagram of interactions between components of a system, such as the system 100, for related file analysis, according to an example of the present disclosure. As shown in FIG. 7, a request from an operator 705 to initiate a related file analysis can be received at the operator computing resource 180. The request, including an identifier of a selected file for the analysis, can be communicated to the backup server 145. Responsive to receiving the request, the backup server 145 actuates the related file analysis service 155 to obtain a set of files that are likely related to the selected file. The related file analysis service 155 then obtains, such as from local storage, a relationship set that includes the selected file as either a source file or a target file. Next, as illustrated by the interactions in 710, for each file identified in the relationship set, including the selected file, related file analysis service 155 restores the file, or the recorded version of the file, from storage system 160. The text of the retrieved files is then extracted and tokenized, such as by using the large-token generator 170. The related file analysis service 155 then computes an intersection between the tokens of the selected file and the other files in the relationship set. The related file analysis service 155 then identifies files that have at least a threshold intersection with the selected file (e.g., a specified percentage of common tokens relative to the size of selected file) and provides the identified files to the operator 705.

The processes described herein can include any other steps or operations for implementing the techniques of the present disclosure.

While the operations processes described in the discussed processes are shown as happening sequentially in a specific order, in other examples, one or more of the operations may be performed in parallel or in a different order. Additionally, one or more operations may be repeated two or more times.

Figure 8:
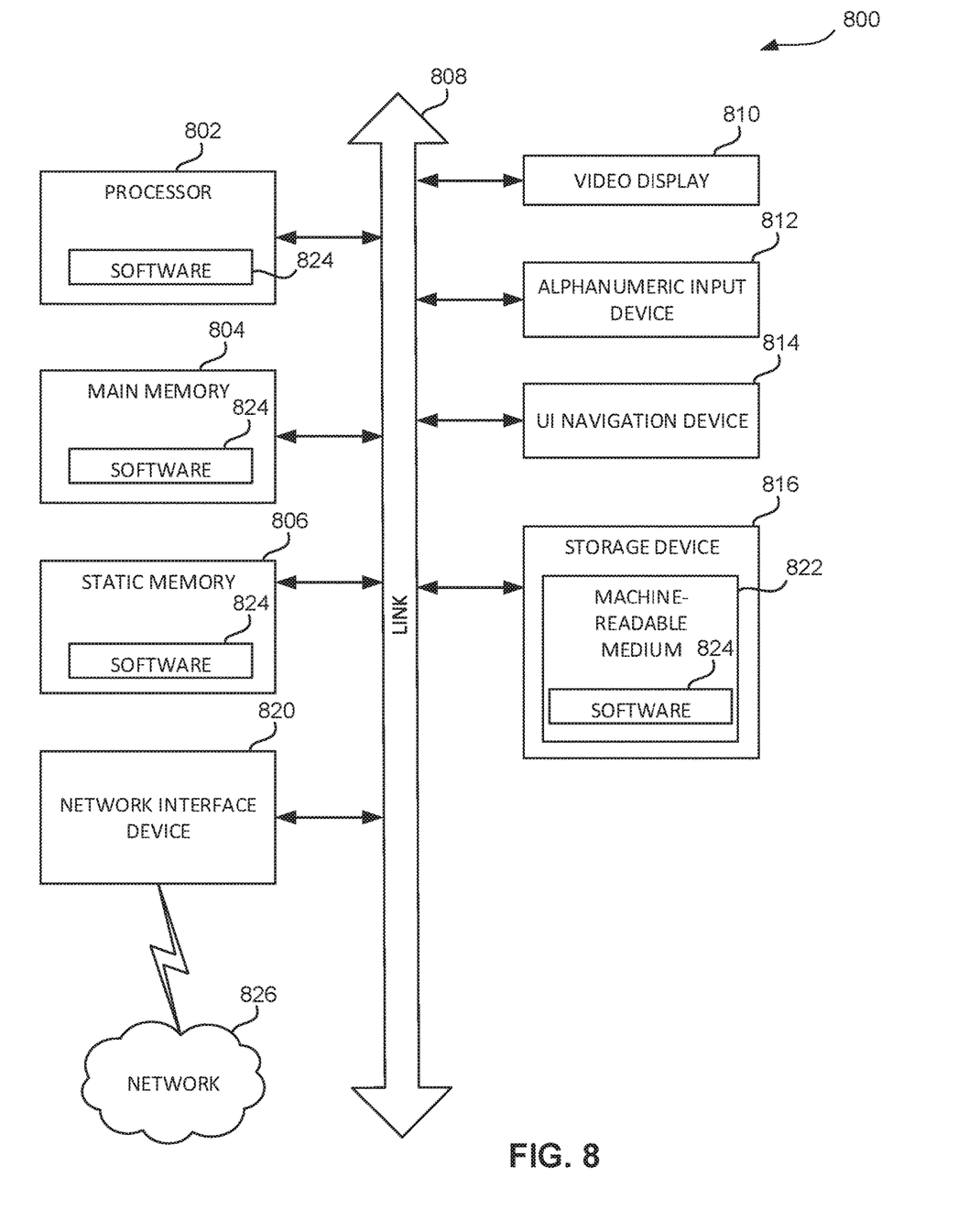
FIG. 8 illustrates a diagrammatic representation of a machine in the form of a computer system within which a set of instructions may be executed for causing the machine to perform any one or more of the methodologies discussed herein, according to an example of the present disclosure.

FIG. 8 illustrates a diagrammatic representation of a machine in the form of a computer system within which a set of instructions may be executed for causing the machine to perform any one or more of the methodologies discussed herein, according to an example of the present disclosure. The computer system 800 is an example of one or more of the computing resources discussed herein.

In alternative examples, the machine operates as a stand-alone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one example, the video display unit 810, input device 812 and UI navigation device 814 are incorporated into a touch screen display. The computer system 800 may additionally include a storage device 816 (e.g., a drive unit), such as a global positioning system (GPS) sensor, compass, accelerometer, pyrometer, magnetometer, or other sensors.

The storage device 816 includes a machine-readable medium 822 on which is stored one or more sets of data structures and instructions 824 (e.g., software) embodying or utilized by any one or more of the methodologies or functions described herein. In an example, the one or more instructions 824 can constitute an event monitor application 110, the relationship agent 115, the backup server 145, the query service 150, the related file analysis service 155, the large-token generator 170, or the analysis component 175, as described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the—readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any example herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

The above detailed description includes references to the accompanying drawings, which form a part of the detailed description. The drawings show, by way of illustration, specific examples that may be practiced. These examples are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other examples may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as examples may feature a subset of said features. Further, examples may include fewer features than those disclosed in a particular example. Thus, the following claims are hereby incorporated into the Detailed Description, with a claim standing on its own as a separate example. The scope of the examples disclosed herein is to be determined with reference to the appended claims, along with the full scope of equivalents to which such claims are entitled.

What is claimed is:

1. A system to process a set of files to determine whether a content of a target file is related to content of one or more source files, the system comprising:

at least one processor; and memory including instructions that, when executed by the at least one processor, cause the at least one processor to perform operations to:

detect an operation by the first computing system to create or modify the target file;

in response to a determination that the target file has a file type that is eligible for reference tracking, identify the one or more source files based on files that were at least partially loaded in a memory of the first computing system within a window of time that is determined based on the detected operation to create or modify the target file;

generate a data structure that associates a reference to the target file with references to the one or more source files;

obtain a set of file references that are configured to access files stored on a data storage system associated with a first computing system, the set of file references comprising the reference to the target file and the references to one or more source files;

retrieve the target file and the one or more source files using the set of file references;

partition the target file into a first set of tokens;

partition the one or more source files into a second set of tokens;

remove tokens identified as boilerplate tokens from the first set of tokens and the second set of tokens;

identify, based on remaining tokens of the first set of tokens and the second set of tokens, at least one source file of the one or more source files that contain a threshold quantity of tokens of the target file to establish that the at least one source file is related to the target file; and provide the at least one source file to a second computing system with an indication that the at least one source file is related to the target file.

2. The system of claim 1, wherein the instructions to detect the operation to create or modify the target file include instructions to detect an operation to open a file for writing or an operation for create a new file.

3. The system of claim 1, wherein the instructions to detect the operation to modify the target file include instructions to select the one or more source files from files accessed on the first computing system based on a match between metadata associated with the files and a data security criteria.

4. The system of claim 1, wherein the window of time comprises at least one of:

a time period prior to execution of the operation to modify a target file; or a time period after execution of the operation to modify a target file.

5. The system of claim 1, the memory further comprising instructions that, when executed by the at least one processor, cause the at least one processor to perform operations to store file references of files that are at least partially loaded in memory of the first computing system during the window of time.

6. The system of claim 1, wherein the instructions to retrieve the target file and the one or more source files using the set of file references include instructions to retrieve the target file or the one or more source files from a data repository that is configured to store files of the first computing system.

7. The system of claim 1, wherein the instructions to partition the target file into a first set of tokens or to partition the one or more source files into a second set of tokens include instructions to:
  partition at least one of the target file or the one or more source files based on a syntax of the content of the target file; and
  generate the first set of tokens or the second set of tokens based on the partition.

8. The system of claim 1, wherein the instructions to partition the target file into a first set of tokens or to partition the one or more source files into a second set of tokens include instructions to generate tokens based on sentences, phrases, paragraphs, or other logical groupings of textual content in the target file or the one or more source files.

9. The system of claim 1, wherein the instructions to partition the target file into a first set of tokens or to partition the one or more source files into a second set of tokens include instructions to:
  partition the target file or the one or more source files into textual tokens; and
  generate hash code tokens using the textual tokens.

10. The system of claim 1, wherein the instructions to identify at least one source file of the one or more source files that contain a threshold quantity of tokens of the target file include instructions to determine a quantity of tokens from the first set of tokens that are included in the second set of tokens.

11. The system of claim 1, wherein the instructions to provide the at least one source file to a second computing system include instructions to generate a data structure that comprises a reference to the at least one source file and a statistic that is indicative of a quantity of data of the target file that this stored in the at least one source file.

12. A method for processing a set of related files to determine whether contents of a target file is related to contents of one or more source files, the method comprising:
  detecting an operation by the first computing system to create or modify the target file;
  in response to determining that the target file has a file type that is eligible for reference tracking, identifying the one or more source files based on files that were at least partially loaded in a memory of the first computing system within a window of time that is determined based on the detected operation to create or modify the target file;
  generating a data structure that associates a reference to the target file with references to the one or more source files;
  obtaining a set of file references that are configured to access files stored on a data storage system associated with a first computing system, the set of file references comprising the reference to the target file and the references to the one or more source files;
  retrieving the target file and the one or more source files using the set of file references;
  partitioning the target file into a first set of tokens;
  partitioning the one or more source files into a second set of tokens;
  removing tokens identified as boilerplate tokens from the first set of tokens and the second set of tokens;
  identifying, based on remaining tokens of the first set of tokens and the second set of tokens, at least one source file of the one or more source files that contain a threshold quantity of tokens of the target file to establish that the at least one source file is related to the target file; and
  provide the at least one source file to a second computing system with an indication that the at least one source file is related to the target file.

13. The method of claim 12, wherein partitioning the target file into a first set of tokens or to partition the one or more source files into a second set of tokens comprises:
  partitioning the target file or the one or more source files into textual tokens; and
  generating hash code tokens using the textual tokens.

14. The method of claim 12, wherein partitioning the target file into a first set of tokens or to partition the one or more source files into a second set of tokens comprises generating tokens based on sentences, phrases, paragraphs; or other logical groupings of textual context in the target file or the one or more source files.

15. The method of claim 12, wherein detecting the operation to create or modify the target file, comprises detecting an operation to open a file for writing or an operation for create a new file.

16. A non-transitory machine-readable medium comprising instructions, which when executed by a machine, causes the machine to process a set of related files to determine whether contents of a target file is related to contents of one or more source files by performing operations comprising:
  detecting an operation by the first computing system to create or modify the target file;
  in response to a determining that the target file has a file type that is eligible for reference tracking, identifying the one or more source files based on files that were at least partially loaded in a memory of a first computing system within a window of time that is determined based on the detected operation to create or modify the target file;
  generating a data structure that associates a reference to the target file with references to the one or more source files;
  obtaining a set of file references that are configured to access files stored on a data storage system associated with the first computing system, the set of file references comprising the reference to the target file and the references to the one or more source files;
  retrieving the target file and the one or more source files using the set of file references;
  partitioning the target file into a first set of tokens;
  partitioning the one or more source files into a second set of tokens;
  removing tokens identified as boilerplate tokens from the first set of tokens and the second set of tokens;
  identifying, based on remaining tokens of the first set of tokens and the second set of tokens, at least one source file of the one or more source files that contain a threshold quantity of tokens of the target file to establish that the at least one source file is related to the target file; and
  providing the at least one source file to a second computing system with an indication that the at least one source file is related to the target file.

17. The non-transitory machine-readable medium of claim 16, wherein partitioning the target file into a first set of tokens or to partition the one or more source files into a second set of tokens comprises:
  partitioning the target file or the one or more source files into textual tokens; and
  generating hash code tokens based using the textual tokens.

* * * * *